(12) United States Patent
Line et al.

(10) Patent No.: US 11,254,248 B1
(45) Date of Patent: Feb. 22, 2022

(54) SEAT ASSEMBLY WITH PIVOTABLE ARMREST

(71) Applicant: Ford Global Technologies, LLC, Dearborn, MI (US)

(72) Inventors: Johnathan Andrew Line, Northville, MI (US); Russell Joseph Mihm, Beverly Hills, MI (US); Chuck R. Reese, Northville, MI (US); Jimmy Moua, Canton, MI (US); Eric Axel Smitterberg, Berkley, MI (US); Nicholas Alphonse Billardello, Macomb, MI (US); Joseph E. Abramczyk, Farmington Hills, MI (US); Sean Bayle West, Monroe, MI (US); Zhibing Deng, Northville, MI (US); Deepak Patel, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/093,984

(22) Filed: Nov. 10, 2020

(51) Int. Cl.
*B60N 2/75* (2018.01)
*B60R 21/207* (2006.01)
*B60N 2/427* (2006.01)
*B60R 21/00* (2006.01)

(52) U.S. Cl.
CPC ......... *B60N 2/767* (2018.02); *B60N 2/42709* (2013.01); *B60R 21/207* (2013.01); *B60R 2021/0006* (2013.01)

(58) Field of Classification Search
CPC .. B60N 2/767; B60N 2/42709; B60R 21/207; B60R 2021/0006
See application file for complete search history.

(56) References Cited

U.S. PATENT DOCUMENTS

| | | | |
|---|---|---|---|
| 4,270,798 A | 6/1981 | Harder, Jr. | |
| 6,142,563 A | 11/2000 | Townsend et al. | |
| 6,568,743 B1 | 5/2003 | Jayasuriya et al. | |
| 7,195,312 B2 | 3/2007 | Crossman et al. | |
| 7,503,621 B2 | 3/2009 | Mani | |
| 7,828,388 B2 | 11/2010 | Thomas | |
| 9,340,129 B2 | 5/2016 | Roychoudhury | |
| 9,505,325 B2 | 11/2016 | Doan et al. | |
| 9,738,188 B2 | 8/2017 | Honda et al. | |
| 10,081,326 B2 * | 9/2018 | Koike | B60R 21/207 |
| 10,272,865 B2 * | 4/2019 | Nagasawa | B60N 2/753 |
| 10,562,480 B2 * | 2/2020 | Nagasawa | B60R 21/18 |
| 10,569,732 B2 * | 2/2020 | Nagasawa | B60R 21/207 |
| 10,596,993 B2 | 3/2020 | Dry et al. | |
| 10,723,249 B2 * | 7/2020 | Dry | B60N 2/77 |
| 2016/0280101 A1 | 9/2016 | Kramer | |
| 2019/0217803 A1 * | 7/2019 | Dry | B60R 21/23138 |
| 2019/0389350 A1 | 12/2019 | Dry et al. | |

* cited by examiner

*Primary Examiner* — Philip F Gabler
(74) *Attorney, Agent, or Firm* — Frank A. MacKenzie; Bejin Bieneman PLC

(57) ABSTRACT

A seat assembly for a vehicle includes a seat frame. The seat assembly includes an armrest. A hinge pivotally connects the armrest to the seat frame. The armrest includes an upper extension extending upwardly from the hinge and a lower extension extending downwardly from the hinge. The seat assembly includes a deformable member between the seat frame and the lower extension of the armrest. The deformable member is deformable relative to the seat frame and the armrest.

20 Claims, 5 Drawing Sheets

SEAT ASSEMBLY WITH PIVOTABLE ARMREST

BACKGROUND

A side airbag is mounted to a seat assembly and is inflatable along a side of an occupant, specifically along the torso and/or hip of the occupant. The side airbag, for example, may be inflatable between the occupant and a vehicle door. The side airbag helps to control the kinematics of the occupant in vehicle impacts that urge the occupant in a cross-vehicle direction, e.g., a side impact.

DETAILED DESCRIPTION

Figure 1:
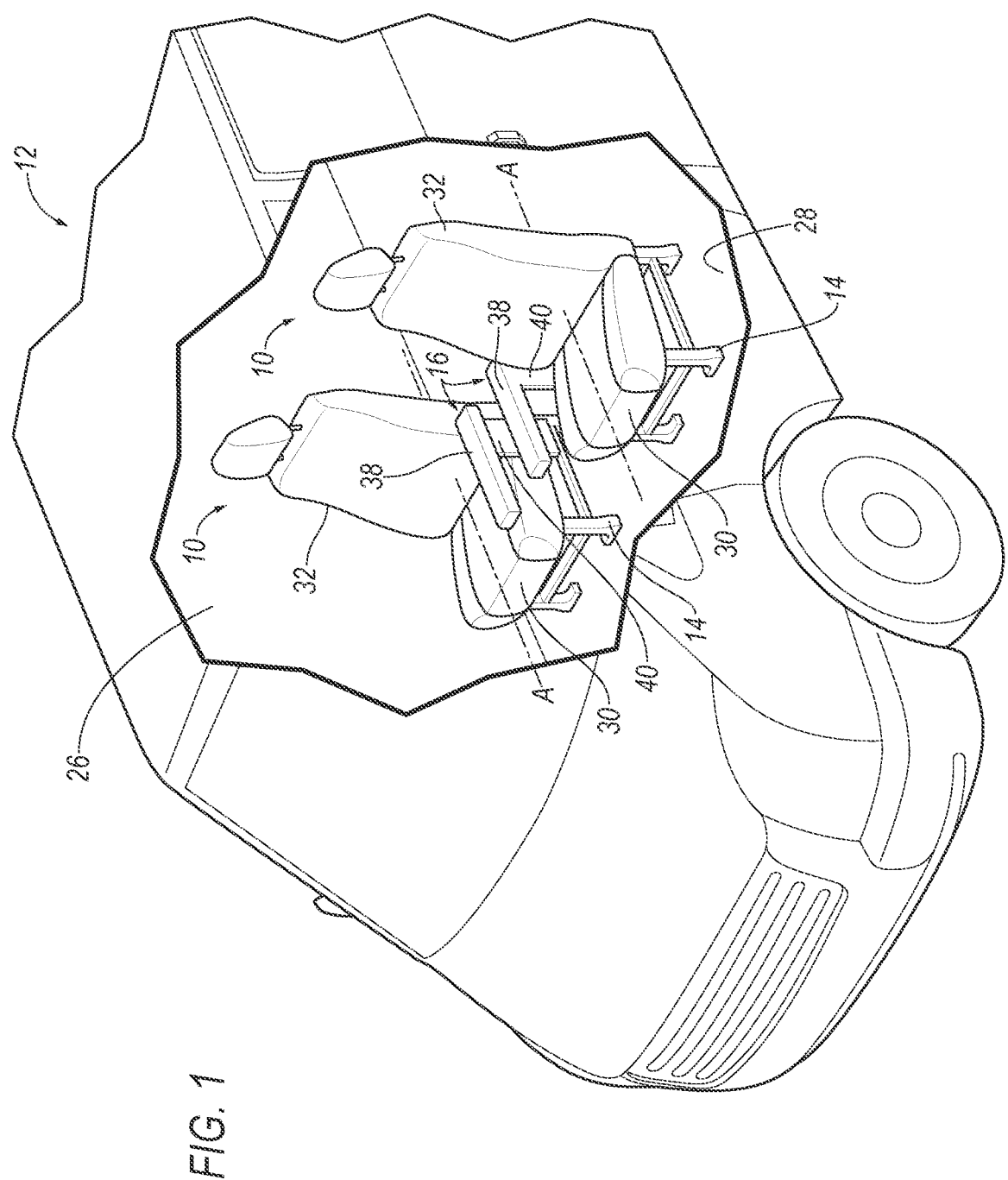
FIG. 1 is a perspective view of a vehicle including a pair of seat assemblies, each having an armrest.
Figure 2:
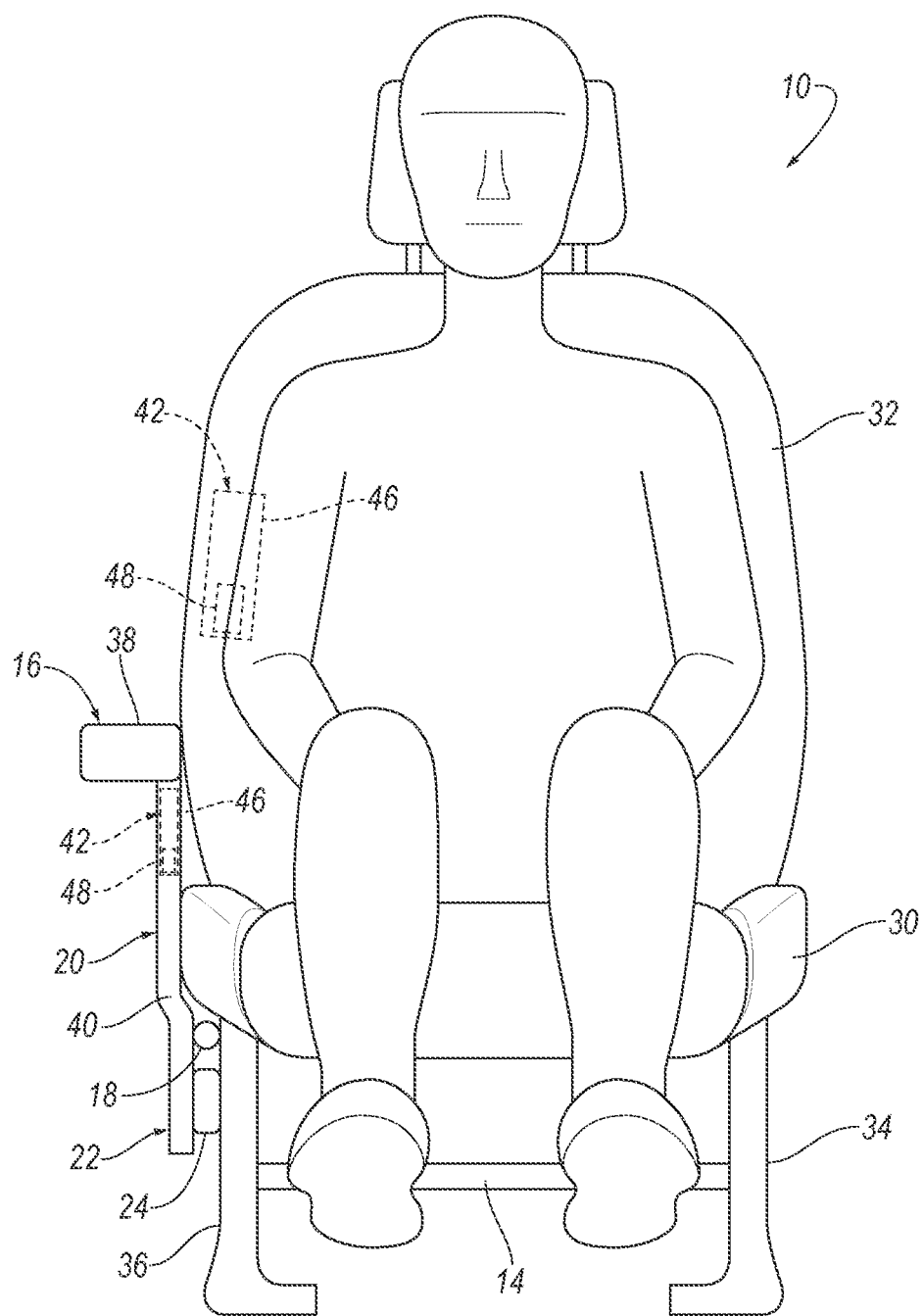
FIG. 2 is a front view of the seat assembly having the armrest with an airbag assembly supported by the armrest and a second airbag assembly supported by a seatback of the seat assembly, both airbag assemblies in an uninflated position.
Figure 3:
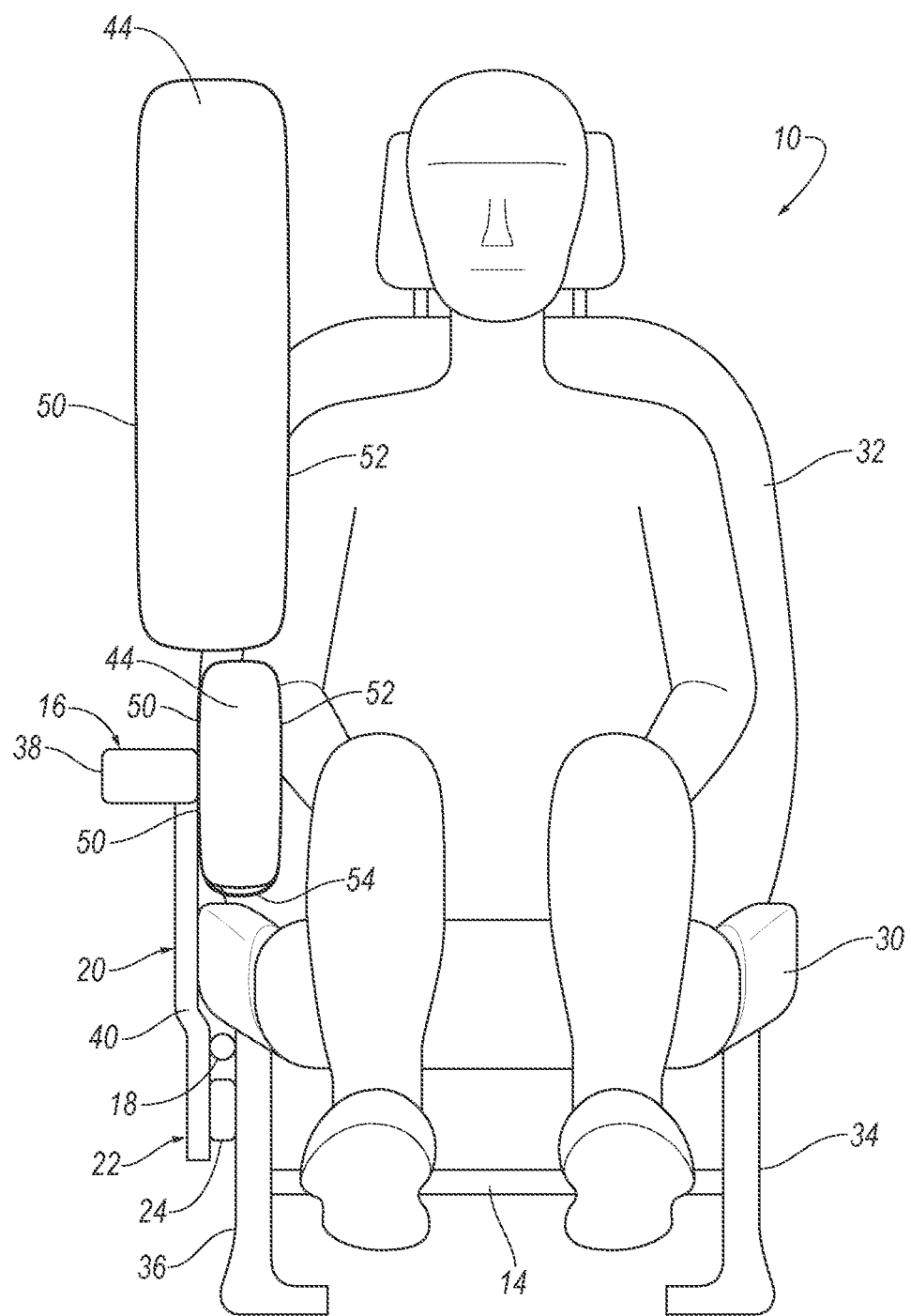
FIG. 3 is a front view of the seat assembly with the airbag assemblies in an inflated position.

A seat assembly includes a seat frame. The seat assembly includes an armrest supported by the seat frame. The seat assembly includes a hinge pivotally connecting the armrest to the seat frame, the armrest having an upper extension extending upwardly from the hinge and a lower extension extending downwardly from the hinge. The seat assembly includes a deformable member between the seat frame and the lower extension of the armrest, the deformable member being deformable relative to the seat frame and the armrest.

The deformable member may abut the lower extension and the seat frame when the armrest is in an upright position.

The deformable member may deform relative seat frame and the armrest when the upper extension of the armrest rotates from the upright position in a seat-outboard direction.

The deformable member may maintain the armrest in an upright position.

The hinge may be rotatable about a seat-fore-and-aft axis.

The deformable member may be an elastomeric material.

The lower extension and the seat frame may be metal.

The seat assembly may include an airbag supported by the upper extension of the armrest.

The airbag may be inflatable upwardly relative to the armrest.

The airbag may be inflatable in a seat-inboard direction relative to the armrest.

The airbag may include an inboard side and an outboard side, the airbag including a tether extending from the inboard side to the outboard side.

The airbag may be spaced from the hinge.

The upper extension of the armrest may be pivotable about the hinge in a seat-outboard direction and the lower extension of the armrest may be pivotable about the hinge in a seat-inboard direction.

The seat assembly may include a seat bottom and a seat back extending upwardly from the seat bottom, the seat bottom having the seat frame.

The seat assembly may include an airbag supported by the seat back and inflatable above the armrest.

The seat assembly may include a second airbag supported by the upper extension of the armrest and inflatable toward the airbag.

The hinge may be spaced from the deformable member.

The armrest may be designed to rotate about the hinge in response to a force on the upper extension of the armrest from a vehicle-side impact.

The seat frame may include a vehicle-inboard end and a vehicle-outboard end, the armrest and the hinge being at the vehicle-inboard end.

With reference to the Figures, wherein like numerals indicate like parts throughout the several views, a seat assembly 10 for a vehicle 12 includes a seat frame 14 and an armrest 16. A hinge 18 pivotally connects the armrest 16 to the seat frame 14. The armrest 16 includes an upper extension 20 extending upwardly from the hinge 18 and a lower extension 22 extending downwardly from the hinge 18. The seat assembly 10 includes a deformable member 24 between the seat frame 14 and the lower extension 22 of the armrest 16. The deformable member 24 is deformable relative to the seat frame 14 and the armrest 16.

Figure 4:
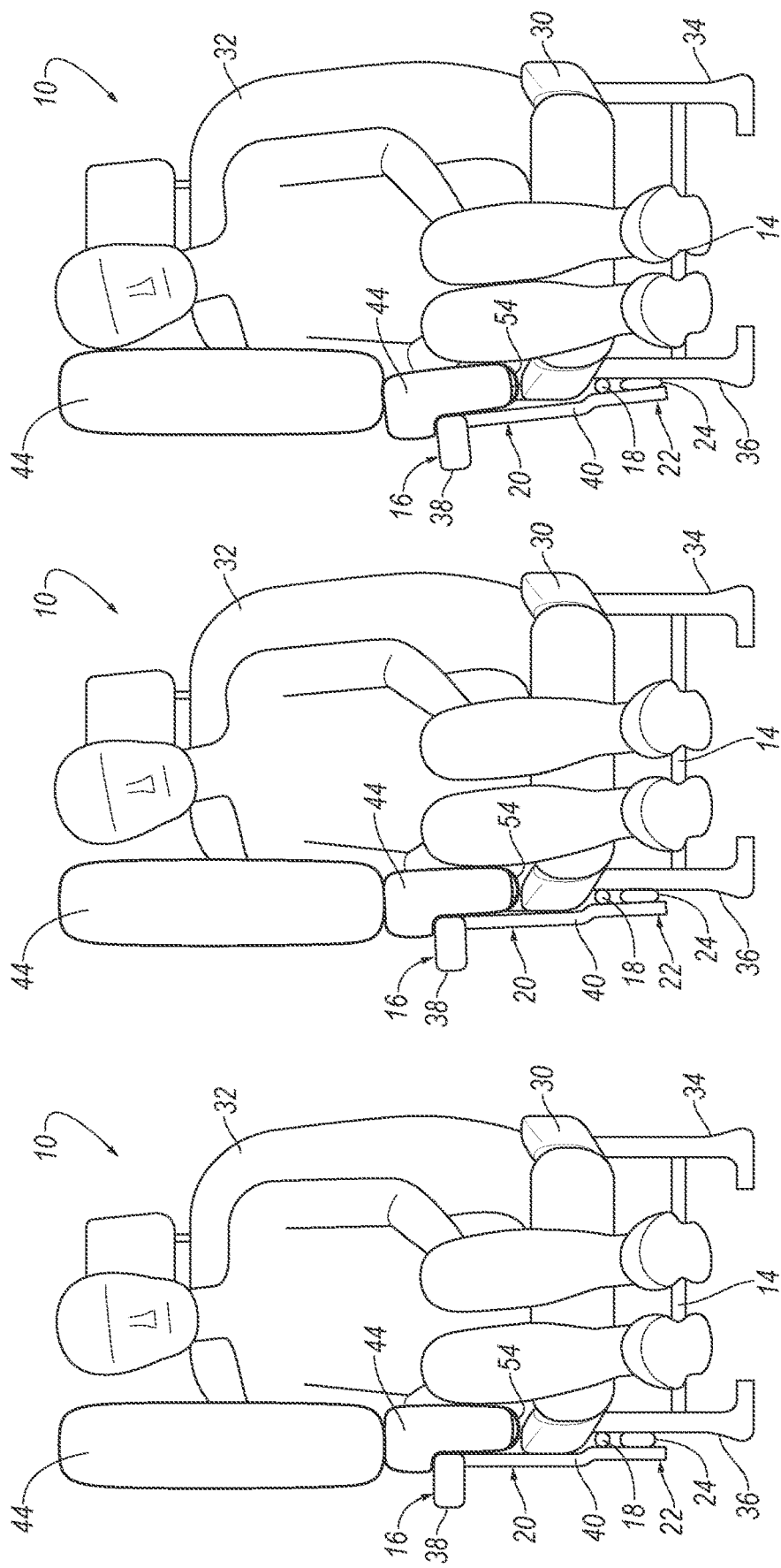
FIG. 4A is a front view of the seat assembly with the airbag assemblies in the inflated position and the armrest having a deformable member maintaining the armrest in an upright position.
FIG. 4B is a front view of the seat assembly with the armrest pivoting about a hinge toward a pivoted position and the deformable member deforming as a result of the pivoting of the armrest.
FIG. 4C is a front view of the seat assembly with the armrest pivoting about the hinge to a pivoted position and the deformable member being deformed as a result of the pivoting of the armrest.

In the event of a vehicle-side impact to the vehicle 12, an occupant may move toward the armrest 16 of the seat assembly 10 and apply a force to the upper extension 20 of the armrest 16. With reference to FIGS. 4A-C, when the force is applied to the upper extension 20, the armrest 16 pivots about the hinge 18 causing the lower extension 22 of the armrest 16 to pivot toward the deformable member 24. The deformable member 24 is deformed between the lower extension 22 and the seat frame 14, absorbing energy from the occupant applying the force to the upper extension 20 of the armrest 16.

The vehicle 12 may be any suitable type of automobile, e.g., a passenger or commercial automobile such as a sedan, a coupe, a truck, a sport utility vehicle, for example, may be autonomous. In other words, the vehicle 12 may be autonomously operated such that the vehicle 12 may be driven without constant attention from a driver, i.e., the vehicle 12 may be self-driving without human input.

With reference to FIG. 1, the vehicle 12 includes a body. The body may be of a unibody construction. In the unibody construction, the body, e.g., rockers, serves as a frame, and the body (including the rockers, pillars, roof rails, etc.) is unitary, i.e., a continuous one-piece unit. As another example, the body and frame may have a body-on-frame construction (also referred to as a cab-on-frame construction). In other words, the body and frame are separate components, i.e., are modular, and the body is supported on and affixed to the frame. Alternatively, the body may have any suitable construction. The body may be formed of any suitable material, for example, steel, aluminum, etc.

The body defines a passenger compartment 26 to house occupants, if any, of the vehicle 12. The passenger compartment 26 may extend across the vehicle 12, i.e., from one side to the other side of the vehicle 12. The passenger compartment 26 includes a front end and a rear end with the front end being in front of the rear end during forward movement of the vehicle 12.

The vehicle 12, specifically the body of the vehicle 12 includes a vehicle floor 28 and a vehicle roof (not numbered) spaced from the vehicle floor 28. The passenger compartment 26 and may extend from the front end of the passenger compartment 26 to the rear end of the passenger compartment 26. The vehicle floor 28 may include upholstery, for example, carpet, and may have a class-A surface facing the passenger compartment 26, i.e., a surface specifically manufactured to have a high quality, finished, aesthetic appearance free of blemishes.

The vehicle roof may be spaced upwardly relative to the vehicle floor 28. The vehicle roof may define the upper boundary of the passenger compartment 26 and extend from the front end of the passenger compartment 26 to the rear end of the passenger compartment 26. The vehicle roof may include upholstery, for example, a headliner, and may have a class-A surface facing the passenger compartment 26.

With continued reference to FIG. 1, the vehicle 12 may include one or more seat assemblies 10. Specifically, the vehicle 12 may include any suitable number of seat assemblies 10. As shown in FIG. 1, the seat assemblies 10 are supported by the vehicle floor 28. The seat assemblies 10 may be arranged in any suitable arrangement in the passenger compartment 26. As in the example shown in the Figures, one or more of the seat assemblies 10 may be at the front end of the passenger compartment 26, e.g., a driver seat assembly and/or a passenger seat assembly. In other examples, one or more of the seat assemblies 10 may be behind the front end of the passenger compartment 26, e.g., at the rear end of the passenger compartment 26. The seat assemblies 10 may be movable relative to the floor to various positions, e.g., movable fore-and-aft and/or cross-vehicle. The seat assemblies 10 may be of any suitable type, e.g., a bucket seat shown in FIG. 1.

Each seat assembly 10 may rotate about a vertical axis (not numbered) that extends through the vehicle roof and the vehicle floor 28. For example, the seat assemblies 10 may rotate between a forward-facing position, a rearward-facing position, a rightward-facing position, a leftward-facing position, and/or positions therebetween. In the forward-facing position, an occupant of the seat assembly 10 faces the front end of the passenger compartment 26. The seat assemblies 10 may rotate completely, i.e., 360°, about the vertical axis. The seat assemblies 10 may rotate between fixed positions, e.g., the forward-facing position and the rearward-facing position, or may be rotatable to an infinite number of positions.

The seat assembly 10 includes a seat bottom 30 and a seatback 32 extending upwardly from the seat bottom 30. The seatback 32 may be supported by the seat bottom 30 and may be stationary or movable relative to the seat bottom 30. The seatback 32 and the seat bottom 30 may be adjustable in multiple degrees of freedom. Specifically, the seatback 32 and the seat bottom 30 may themselves be adjustable. In other words, the seatback 32 and/or seat bottom 30 may include adjustable components within the seatback 32 and/or the seat bottom 30, and/or may be adjustable relative to each other.

The seat bottom 30 has a seat-fore-and-aft axis A. When the seat assembly 10 is the forward-facing position or the rearward-facing position, the seat-fore-and-aft axis A extends along a longitudinal axis of the vehicle 12. When the seat assembly 10 is in the rightward-facing position or the leftward-facing position, the seat-fore-and-aft axis A extends along a cross-vehicle axis of the vehicle 12.

The seat frame 14 is supported by the vehicle floor 28. Specifically, the seat frame 14 may include frame members that are engageable with the vehicle floor 28. A plurality of fasteners may engage the seat frame 14 with the vehicle floor 28.

The seat frame 14 includes a vehicle-inboard end 36 and a vehicle-outboard end 34. When the seat assembly 10 is in the forward-facing position, the vehicle-inboard end 36 is positioned vehicle-inboard from the exterior of the body of the vehicle 12. The vehicle-outboard end 34 is spaced from the vehicle-inboard end 36 of the seat frame 14 cross-vehicle. The vehicle-outboard end 34 is positioned vehicle-outboard when the seat assembly 10 is in the forward-facing position. When an occupant is seated in the seat assembly 10 and the seat assembly 10 is in the forward position, the vehicle-inboard end 36 is to the right of the occupant and the vehicle-outboard end 34 is to the left of the occupant.

As an example, the seat frame 14 may include a seatback frame (not numbered) and a seat bottom frame (not numbered). Specifically, the seatback 32 may include the seatback frame and the seat bottom 30 may include the seat bottom frame. The seat frame 14, e.g., the seat bottom frame and the seatback frame, may include tubes, beams, etc. The seat frame 14 may be of any suitable plastic material, e.g., carbon fiber reinforced plastic (CFRP), glass fiber-reinforced semi-finished thermoplastic composite (organosheet), etc. The seat frame 14 may be metal. As another example, some or all components of the seatback frame may be formed of a suitable metal, e.g., steel, aluminum, etc.

The seatback frame may include a pair of upright frame members. The upright frame members are elongated, and specifically, are elongated in a generally upright direction when the seatback 32 is in a generally upright position. The upright frame members are spaced from each other and the seatback frame includes cross-members (not shown) extending between the upright frame members. The seat bottom frame may include the frame member to engage the seat assembly 10 with the vehicle floor 28.

The seat assembly 10 may include a covering around the seat frame 14. Specifically, the covering may include a seatback covering and a seat bottom covering. The covering and/or coverings may include upholstery and padding. The upholstery may be cloth, leather, faux leather, or any other suitable material. The upholstery may be stitched in panels around the seat frame 14. The padding may be between the covering and the seat frame 14 and may be foam or any other suitable material.

With reference to FIGS. 1-5, the seat assembly 10 includes the armrest 16 supported by the seat frame 14. Specifically, the hinge 18 pivotally connects the armrest 16 to the seat frame 14. The weight of the armrest 16 may be supported by the hinge 18 on the seat frame 14. Specifically, the weight an occupant places on the armrest 16 when seated in the seat assembly 10 is supported by the hinge 18 and the seat frame 14. As shown in the example in the Figures, the armrest 16 may be supported by the seat bottom frame. In other examples, the armrest 16 may be supported by the seatback frame of the seat frame 14.

In the example shown in the Figures, the armrest 16 is supported on the vehicle-inboard end 36 of the seat frame 14 when the seat assembly 10 is in the forward-facing position. In other words, when an occupant is seated in the seat assembly 10 the armrest 16 is to the right of the occupant.

The armrest 16 includes an arm support portion 38 and an upright portion 40. The arm support portion 38 is above the upright portion 40 and is designed to support an arm of an occupant. The upright portion 40 is connected to the seat frame 14 and supports the arm support portion 38 on the seat frame 14, as described further below.

The arm support portion 38 may be elongated in a generally seat-fore-and-aft direction. Specifically, the arm support portion 38 may be elongated in the seat-fore-and-aft direction and or may deviate from the seat-fore-and-aft direction in a suitable angle to support an arm of an occupant. The upright portion 40 may be elongated in a generally vertical direction in the absence of force on the armrest 16. Specifically, the upright portion 40 may be elongated vertically or may deviate from vertical in a suitable angle to support an arm of an occupant. The arm support portion 38 may be covered, e.g., with an upholstery, padding, etc.

The hinge 18 is supported on the vehicle-inboard end 36 of the seat frame 14 when the seat assembly 10 is in the forward-facing position. As discussed above, the weight of the armrest 16 and weight of use by an occupant is supported by the hinge 18 on the seat frame 14. The hinge 18 may be any type of hinge 18 suitable to support the weight of the armrest 16 and of the occupant when in use, e.g., a barrel hinge 18, pin hinge 18, butt hinge 18, etc. The hinge 18 may be the only connection point of the armrest 16 to the seat frame 14. In the example shown in the Figures, the armrest 16 is supported by seat bottom frame. As another example, the armrest 16 may be supported by the seatback frame.

The hinge 18 is pivotable about an axis of rotational along the seat-fore-and-aft axis A, i.e., the armrest 16 is pivotable about the hinge 18 along an axis of rotation along the seat-fore-and-aft axis A. The armrest 16 pivots about the hinge 18 from an upright position to a pivoted position when a force exceeding a threshold is applied to the armrest 16 During normal operation of the vehicle 12, the armrest 16 is in the upright position. Specifically, during normal operation in the absence of forces of the magnitude associated with vehicle-side impact, the hinge 18 is designed to prevent movement of the arm support portion 38 seat-inboard from the upright position. The deformable member 24, when undeformed, prevents movement of the arm support portion 38 seat outboard in the absence of forces of the magnitude associated with vehicle-side impact. In the event of impact on the armrest 16 by an occupant resulting from a vehicle-side impact, the armrest 16 is designed to pivot about the hinge 18 to the pivoted position in response to an occupant impact the armrest 16 resulting the vehicle-side impact.

The armrest 16, specifically the upright portion 40 of the armrest 16, includes the upper extension 20 and the lower extension 22. The upper extension 20 extends upwardly from the hinge 18. Specifically, the upper extension 20 of the armrest 16 extends from the hinge 18 away from the vehicle floor 28. The lower extension 22 extends downwardly from the hinge 18. Specifically, the lower extension 22 extends from the hinge 18 toward the vehicle floor 28. The upper extension 20 and the lower extension 22 may be unitary, i.e., a uniform piece of material with no seams, joints, fasteners, or adhesives holding it together. Specifically, the upper extension 20 and the lower extension 22 may be formed together simultaneously as a single continuous unit, e.g., by machining from a unitary blank, molding, forging, casting, etc. Non-unitary components, in contrast, are formed separately and subsequently assembled, e.g., by threaded engagement, welding, etc. The upright portion 40, including the lower extension 22 and the upper extension 20, may be metal, plastic, or any suitable material.

In the event of a vehicle-side impact, the upper extension 20 is pivotable about the hinge 18 in a seat-outboard direction to the pivoted position when impacted by an occupant. In other words, the upper extension 20 pivots about the hinge 18 in a direction away from the center of the seat frame 14. In the event the upper extension 20 pivots about the hinge 18 in the seat-outboard direction, the lower extension 22 pivots about the hinge 18 in a seat-inboard direction. In other words, the lower extension 22 pivots about the hinge 18 in a direction toward the center of the seat frame 14. When the lower extension 22 pivots in the seat-inboard direction, the lower extension 22 loads the deformable member 24, as described further below. In the example shown in the Figures where the seat is positioned in the forward-facing position, the upper extension 20 is pivotable about the hinge 18 in a vehicle-inboard direction, i.e., away from the center of the vehicle 12, and the lower extension 22 is pivotable about the hinge 18 in a vehicle-outboard direction, i.e., away from the center of the vehicle 12.

With reference to FIGS. 2-5, the deformable member 24 is between the seat frame 14 and the armrest 16. Specifically, the deformable member 24 is between the seat frame 14 and the lower extension 22 of the armrest 16. As shown in the example in the Figures, the deformable member 24 may be between the armrest 16 and the seat bottom frame. As another example, the deformable member 24 may be between the armrest 16 and the seatback frame.

The deformable member 24 is fixed to one of the seat frame 14 and the armrest 16. For example, the deformable member 24 may be fixed to the seat frame 14, e.g., the seat bottom frame such that the armrest 16, e.g., the lower extension 22, moves toward the deformable member 24 when the armrest 16 pivots to the pivoted position. As another example, the deformable member 24 may be fixed to the armrest 16, e.g., the lower extension 22 such that the deformable member 24 moves with the armrest 16 toward the seat frame 14, e.g., the seat bottom frame, when the armrest 16 pivots to the pivoted position. The deformable member 24 may abut both the seat frame 14, e.g., the seat bottom frame, and the armrest 16, e.g., the lower extension 22, in the upright position.

The hinge 18 is spaced from the deformable member 24 along the lower extension 22. Specifically, the deformable member 24 is spaced downwardly from the hinge 18 along the lower extension 22, i.e., the deformable member 24 is spaced toward the vehicle floor 28 from the hinge 18.

The deformable member 24 deforms relative to the seat frame 14 and the armrest 16 as the armrest 16 pivots from the upright position to the pivoted position, i.e., as the upper extension 20 pivots in the seat-outboard direction and the lower extension 22 pivots in the seat-inboard direction. Specifically, the deformable member 24 deforms when the armrest 16 is impacted by an occupant with force of the magnitude associated with vehicle-side impact, As shown in the progression in FIGS. 4A-4C, in the event of a vehicle-side impact that forces an occupant into the armrest 16, the occupant applies a force to the upper extension 20 of the armrest 16 to urge the upper extension 20 to pivot about the hinge 18 in the seat-outboard direction. This urges the lower extension 22 to pivot about the hinge 18 in the seat-inboard direction to apply a force to the deformable member 24. In this event, the lower extension 22 deforms the deformable member 24 to absorb energy during the vehicle-side impact, i.e., the deformable member 24 is compressed as the armrest 16 pivots from the upright position toward the pivoted position.

The deformable member 24 may maintain the armrest 16 in the upright position in the absence of forces of a magnitude associated with the occupant impacting the armrest 16 in a vehicle-side impact. For example, the deformable member 24 may maintain the armrest 16 in the upright position when an occupant rests an arm on the armrest 16. Specifically, the deformable member 24 may be designed to have a rigidity, i.e., a resistance to deformation, so that the deformable member 24 does not substantially deform when an occupant rests an arm on the armrest 16 to maintain the armrest 16 in the upright position and so that the deformable member 24 deforms when an occupant impacts the armrest 16 during a vehicle-side impact to absorb energy as the armrest 16 pivots to the pivoted position.

The deformable member 24 is of a material type and/or geometric design to deform when subjected to forces associated with vehicle-side impact and to remain substantially undeformed when subjected to forces below the magnitude associated with vehicle-side impact to maintain the armrest 16 in the upright position. As one example, the deformable material 24 may be a block of elastomeric material. For example, the deformable material 24 may be polyurethane and, specifically, cellular polyurethane or solid polyurethane. As another example, the deformable material 24 may be plastic, e.g., a block of plastic. For example, the deformable material 24 may be nylon. As another example, the deformable material 24 may be metal. In such an example, the deformable material 24 may have a geometry that deforms when subjected to forces associated with vehicle-side impact. For example, the deformable material 24 may have a flange, a hollow cavity, or other features that deform when subjected to forces associated with vehicle-side impact to allow the armrest 16 to rotate from the upright position to the pivoted position.

The seat assembly 10 may include one or more airbag assemblies 42. For example, in the example shown in FIGS. 2-4C, the seat assembly 10 may include two airbag assemblies 42, i.e., a first airbag assembly 42 and a second airbag assembly 42. In such an example, one airbag assembly 42 is supported by the armrest 16 and the other airbag assembly 42 is supported by the seatback 32. In the example shown in FIG. 5, the seat assembly 10 may include one airbag assembly 42. In that example the airbag assembly 42 is supported by the armrest 16 and is inflatable upwardly between the armrest 16 and an occupant of the seat assembly 10.

The airbag assembly 42 includes an airbag 44, an airbag housing 46, and an inflator 48. The inflator 48 inflates the airbag 44 from an uninflated position to an inflated position, as described further below.

The airbag 44 is supported by the airbag housing 46. The airbag housing 46 houses the airbag 44 in the uninflated position and supports the airbag 44 in the inflated position. The airbag 44 may be rolled and/or folded to fit within the airbag housing 46 in the uninflated position. The airbag housing 46 may be of any suitable material, e.g., a rigid polymer, a metal, a composite, or a combination of rigid materials.

The inflator 48 is in fluid communication with the airbag 44. The inflator 48 expands the airbag 44 with inflation medium, such as a gas, to move the airbag 44 from the uninflated position to the inflated position. The inflator 48 may be supported by any suitable component. For example, the inflator 48 may be supported by the housing. The inflator 48 may be, for example, a pyrotechnic inflator 48 that ignites a chemical reaction to generate the inflation medium, a stored gas inflator 48 that releases (e.g., by a pyrotechnic valve) stored gas as the inflation medium, or a hybrid. The inflator 48 may be, for example, at least partially in the inflation chamber to deliver inflation medium directly to the inflation chamber or may be connected to the inflation chamber through fill tubes, diffusers, etc.

The airbag 44 may include an inboard side 50 and an outboard side 52 spaced from the inboard side 50 in the inflated position. In the inflated position, the inboard side 50 may face the seat-outboard direction, i.e., away from the center of the seat frame 14. The outboard side 52 of the airbag 44 may face away from the armrest 16. Specifically, the inboard side 50 of the airbag 44 may abut, i.e., contact, the armrest 16 in the inflated position.

The airbag 44 may include a tether 54 extending from the inboard side 50 to the outboard side 52. The tether 54 may be attached to the inboard side 50 and the outboard side 52 of the airbag 44 to control the inflation of the airbag 44 as the airbag 44 inflates to the inflated position. The tether 54 may be connected in any suitable manner to the inboard side 50 and the outboard side 52, e.g., adhesive, stitching, etc.

The airbag 44 may be woven nylon yarn, for example, nylon 6, 6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

In the example shown in FIGS. 2-4C where the seat assembly 10 includes two airbag assemblies 42, the first of the airbag assemblies 42 is supported by the upright portion 40 of the armrest 16 of the seat assembly 10. Specifically, the airbag 44 is supported by the upper extension 20 of the armrest 16. The airbag 44 is spaced from the hinge 18 along the upright portion 40 of the armrest 16, i.e., the airbag 44 is spaced upwardly from the hinge 18 on the upper extension 20 of the armrest 16.

With continued reference to the example of FIGS. 2-4C, the second of the airbag assemblies 42 is supported by the seatback 32, i.e., the seatback frame. The airbag 44 inflates above the first of the airbag assemblies 42.

In the event of a vehicle-side impact, the airbag 44 supported by the armrest 16 is inflatable to the inflated position from the upper extension 20. The airbag 44 is inflatable in the seat-inboard direction relative to the armrest 16, i.e., the airbag 44 inflates away from the armrest 16 and toward the center of the seat frame 14. The airbag 44 inflates upwardly relative to the armrest 16 to the inflated position. In other words, the airbag 44 inflates away from the upper extension 20 of the armrest 16 toward the seatback 32 of the seat assembly 10. The airbag 44 may inflate between the armrest 16 and the occupant of the seat assembly 10. In the example shown in FIGS. 2-4, the airbag 44 supported by the armrest 16 may extend only partially along the seatback 32. In such an example, the airbag 44 may be adjacent a lower portion of an occupant seated in the seat assembly 10. The second of the airbags is inflatable to the inflated position along the seatback 32 and downwardly relative to the seatback 32 toward the first of the airbags. As shown in the Figures, the two airbags may abut each other in the inflated position where the two airbags meet in the inflated position.

Figure 5:
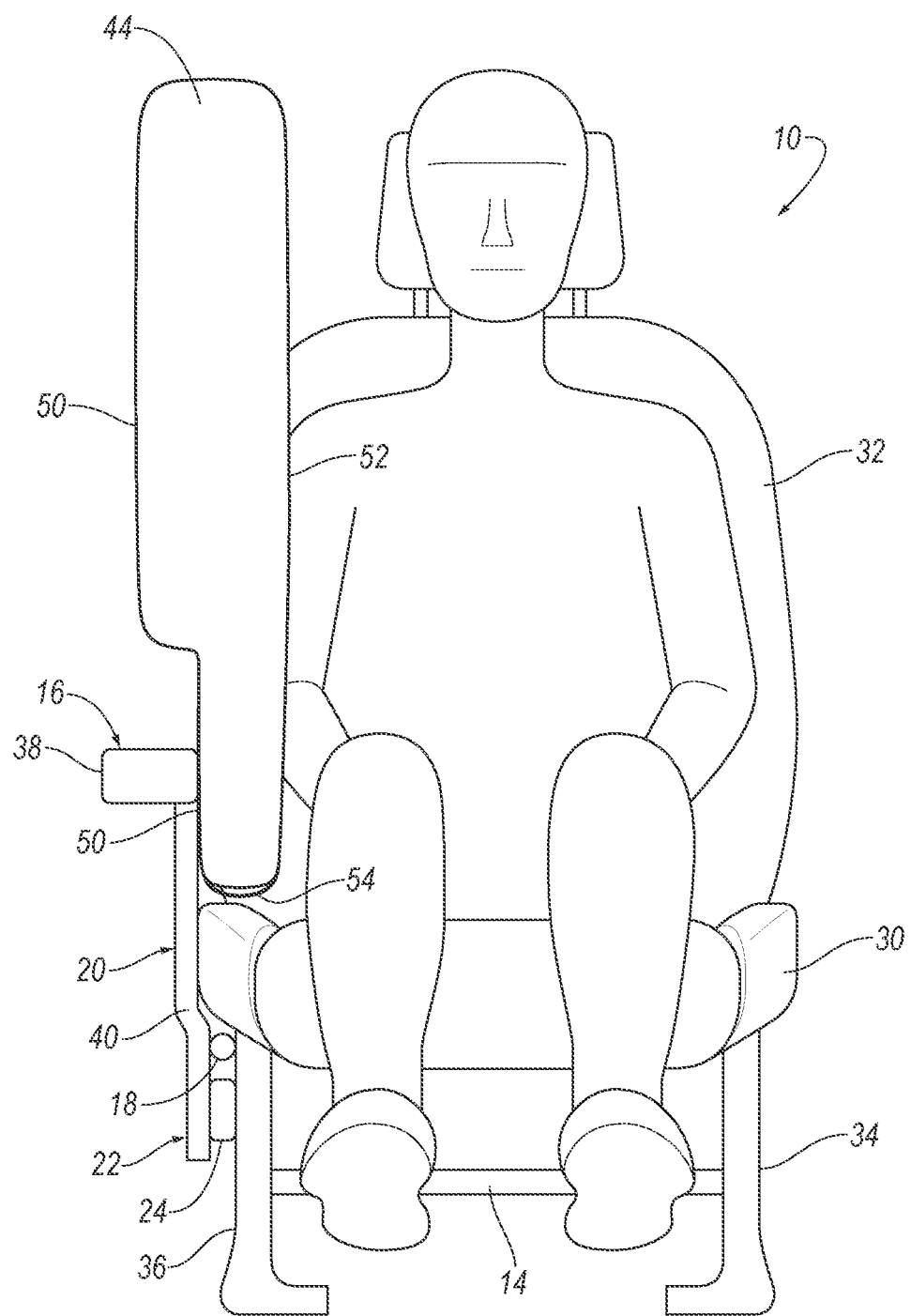
FIG. 5 is a front view of the seat assembly including an airbag assembly supported by the armrest.

In the example shown in FIG. 5 where the seat assembly 10 includes only one airbag assembly 42, the airbag assembly 42 is supported by the upper extension 20. The airbag 44 is inflatable in the seat-inboard direction relative to the armrest 16, i.e., the airbag 44 inflates away from the armrest 16 and toward the center of the seat frame 14. The airbag 44 may extend upwardly relative to the armrest 16 along all or most of the seatback 32. In such an example, the airbag 44 may extend upwardly and adjacent the head of the occupant when an occupant is seated in the seat assembly 10. The airbag 44 inflates between the occupant of the seat assembly 10 and the armrest 16.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A seat assembly comprising:
   a seat frame;
   an armrest supported by the seat frame;
   a hinge pivotally connecting the armrest to the seat frame, the armrest having an upper extension extending upwardly from the hinge and a lower extension extending downwardly from the hinge; and
   a deformable member between the seat frame and the lower extension of the armrest, the deformable member being deformable relative to the seat frame and the armrest.

2. The seat assembly of claim 1, wherein the deformable member abuts the lower extension and the seat frame when the armrest is in an upright position.

3. The seat assembly of claim 2, wherein the deformable member deforms relative to the seat frame and the armrest when the upper extension of the armrest rotates from the upright position in a seat-outboard direction.

4. The seat assembly of claim 2, wherein the deformable member maintains the armrest in an upright position.

5. The seat assembly of claim 4, wherein the deformable member deforms relative to the seat frame and the armrest when the upper extension of the armrest rotates from the upright position in a seat-outboard direction.

6. The seat assembly of claim 1, wherein the hinge is rotatable about a seat-fore-and-aft axis.

7. The seat assembly of claim 1, wherein the deformable member is an elastomeric material.

8. The seat assembly of claim 7, wherein the lower extension and the seat frame are metal.

9. The seat assembly of claim 1, further comprising an airbag supported by the upper extension of the armrest.

10. The seat assembly of claim 9, wherein the airbag is inflatable upwardly relative to the armrest.

11. The seat assembly of claim 10, wherein the airbag is inflatable in a seat-inboard direction relative to the armrest.

12. The seat assembly of claim 9, wherein the airbag includes an inboard side and an outboard side, the airbag including a tether extending from the inboard side to the outboard side.

13. The seat assembly of claim 9, wherein the airbag is spaced from the hinge.

14. The seat assembly of claim 1, wherein the upper extension of the armrest is pivotable about the hinge in a seat-outboard direction and the lower extension of the armrest is pivotable about the hinge in a seat-inboard direction.

15. The seat assembly of claim 1, further comprising a seat bottom and a seat back extending upwardly from the seat bottom, the seat bottom having the seat frame.

16. The seat assembly of claim 15, further comprising an airbag supported by the seat back and inflatable above the armrest.

17. The seat assembly of claim 16, further comprising a second airbag supported by the upper extension of the armrest and inflatable toward the airbag.

18. The seat assembly of claim 1, wherein the hinge is spaced from the deformable member.

19. The seat assembly of claim 1, wherein the armrest is designed to rotate about the hinge in response to a force on the upper extension of the armrest from a vehicle-side impact.

20. The seat assembly of claim 1, wherein the seat frame includes a vehicle-inboard end and a vehicle-outboard end, the armrest and the hinge being at the vehicle-inboard end.

* * * * *